United States Patent
Bruehmann et al.

[11] Patent Number: 6,089,831
[45] Date of Patent: Jul. 18, 2000

[54] COMPRESSED AIR SUPPLY SYSTEM FOR VEHICLE COMPRESSED AIR INSTALLATION AND PROCESS FOR CONTROLLING SAID SYSTEM

[75] Inventors: Werner Bruehmann, Stuttgart; Matthias Alt, Oldenburg, both of Germany

[73] Assignee: Knorr-Bremse, Systeme fur Nutzfahrzeuge GmbH, Munich, Germany

[21] Appl. No.: 08/930,125
[22] PCT Filed: Mar. 2, 1996
[86] PCT No.: PCT/DE96/00366
 § 371 Date: Oct. 29, 1997
 § 102(e) Date: Oct. 29, 1997
[87] PCT Pub. No.: WO96/34785
 PCT Pub. Date: Nov. 7, 1996

[30] Foreign Application Priority Data

Apr. 29, 1995 [DE] Germany ............... 195 15 895

[51] Int. Cl.[7] ................................................. F04B 49/00
[52] U.S. Cl. .................. 417/282; 417/302; 417/307; 417/308; 417/304; 303/3; 303/7
[58] Field of Search ....................... 417/282, 302, 417/297, 304, 307, 308, 442, 313, 440; 340/454; 303/15, 3

[56] References Cited

U.S. PATENT DOCUMENTS

| | | | |
|---|---|---|---|
| 3,732,038 | 5/1973 | Pilarczyk et al. | 417/282 |
| 4,336,627 | 6/1982 | Bascus | 15/321 |
| 4,556,942 | 12/1985 | Russo et al. | 364/431.07 |
| 4,616,881 | 10/1986 | Muller et al. | 303/7 |
| 4,949,262 | 8/1990 | Buma et al. | 364/424.05 |
| 5,038,826 | 8/1991 | Kabai et al. | 137/625.65 |
| 5,572,187 | 11/1996 | Williford | 340/454 |
| 5,595,588 | 1/1997 | Blevins | 96/108 |
| 5,615,929 | 4/1997 | Broome | 303/7 |
| 5,632,802 | 5/1997 | Grgich et al. | 95/10 |
| 5,678,900 | 10/1997 | Blanz . | |

FOREIGN PATENT DOCUMENTS

4421575A1  1/1996  Germany .

Primary Examiner—Charles G. Freay
Assistant Examiner—Cheryl J. Tyler
Attorney, Agent, or Firm—Ronald E. Greigg; Edwin E. Greigg

[57] ABSTRACT

An air compressor, from whose outlet a supply line leads to an air drier for the purpose of supplying the compressed air system. On the outlet side of the air drier, the supply line branches into a plurality of line branches that lead to at least two consumer circuits. The pressure in the consumer circuits can be monitored by pressure sensors. Furthermore, control electronics are provided which are connected to the pressure sensors. The consumer circuits can be disconnected from the compressed air supply by a closing member that is disposed in the respective supply line branch and can be switched by the programmable control electronics. By means of this, the supply of compressed air into the consumer circuits and the withdrawal of compressed air for transfer from one circuit into the others can be controlled by the control electronics. The compressed air supply device can be used in the vehicle compressed air systems of commercial vehicles.

27 Claims, 3 Drawing Sheets

6,089,831

COMPRESSED AIR SUPPLY SYSTEM FOR VEHICLE COMPRESSED AIR INSTALLATION AND PROCESS FOR CONTROLLING SAID SYSTEM

PRIOR ART

The invention relates to a compressed air supply device for vehicle compressed air systems. The subject of the invention is also a process for controlling a compressed air supply device of this kind.

EP 0 523 194 B1 has disclosed a compressed air supply device of this kind for vehicle compressed air systems. It is provided with an air compressor that can be shut off, in order to feed compressed air via an air drier into a reservoir. A pressure sensor disposed on the reservoir monitors the pressure of the injected air. Its pressure value is evaluated by control electronics in order to switch the air compressor on and off. In addition, the humidity of the air in the system is sensed and the control electronics control the regeneration of the air drier as a function of pressure and humidity. EP 0 523 194 B1 contains no indications about the remaining embodiment of the compressed air system and the safeguarding of the compressed air reservoir.

National regulations and international guidelines require the presence of a number of compressed air consumer circuits in vehicle compressed air systems in order to assist in retaining the function of the brake system in the event of a failure of the brake circuit. Furthermore, a reciprocal safeguarding of the circuits is stipulated so that if one circuit fails, the function of the undamaged circuit is retained. Therefore, overflow valves with limited return flow are disposed on the outlet side of the air drier of the compressed air system, and several of them are combined into one safety valve, for example according to DE 42 09 034 A1. In addition to the object of distributing the compressed air to the various consumer circuits and safeguarding these in relation to one another in the event of a failure of a circuit as well as against the failure of the air compressor, here, moreover, the primarily important filling of selected consumer circuits is assured. With overflow valves of this kind, the system-specific opening and closing pressures are determined based on structural conditions and are not subject to any outside influences when the compressed air system of the vehicle is operated.

ADVANTAGES OF THE INVENTION

The compressed air supply device according to the invention has the advantage over the prior art that in a vehicle specific manner or as a function of the operating conditions of the compressed air system or the vehicle, the programmable control electronics can select and control or regulate the supply of compressed air into the consumer circuit and the withdrawal of compressed air from a circuit for transfer into another circuit or for the purpose of regenerating the air drier. As a result, in comparison to the prior "rigid", i.e. defined operating mode of the compressed air supply device, this permits the achievement of a more rapid operational readiness of the compressed air system, an energy savings in the operation of the air compressor, an increased security from the loss of compressed air when a circuit is damaged, a filling of the consumer circuits to different, changeable pressure values, and an economical regeneration of the air drier that fulfills the requirements. In order to adapt the compressed air supply device to various vehicle compressed air systems or changed operating conditions, the only thing required is an intervention into the control electronics by inserting or changing a corresponding control element.

Advantageous improvements and updates of the compressed air supply device are possible by means of the measures setforth hereinafter.

With the equipping of the compressed air supply device, which equipping is extraordinarily simple in terms of the device, the above-mentioned advantages are achieved, without jeopardizing the operational safety since the suggested locking members, the pressure sensors, and the control electronics have a high degree of functional safety.

However, if the proven pneumatic-mechanical safeguarding of the compressed air system, for example according to DE 42 09 034 A1 should be retained, then the embodiment of the compressed air supply device represents an advantageous embodiment.

In contrast, with the measure setforth a simplification of the device can be achieved by virtue of the fact that the overflow valves can be switched directly by the control electronics or, can be switched indirectly by them.

With the improvement of the invention described herein, the availability of control pressure is assured on both the air compressor side and the consumer side for switching the overflow valves as described.

With the unlikely event of a failure of the control electronics, the proven pneumatic-mechanical safeguarding of the consumer circuits can be achieved by means of the overflow valves.

With the improvement of the invention disclosed, the possibility of electronic control of the pressure fluid supply device is also logically extended to the safety valve that is used as an overflow protection as well as being consulted for controlling the regeneration of the air drier.

If on the other hand, the known pneumatic-mechanically controlled embodiment of the safety valve is retained as a pressure limiting valve in the compressed air supply device, then the measure setforth also permits it to be controlled by the control electronics.

By means of the control electronics that monitor the state of the compressed air system, it is possible to initiate operation of the air compressor or to switch it on or off in a simple manner that fulfills the requirements and is also in accordance with economical criteria. According to the improvement of the invention setforth, the control electronics can use data which indicate the operating state of the drive motor of the vehicle.

The process according to the invention is for controlling a compressed air supply device for vehicle compressed air systems and, distinguishes itself advantageously in that by means of the control electronics, the availability of compressed air on the supply side in the motor vehicle compressed air system can be varied in such a way that the injection of compressed air into consumer circuits that are possibly used for different purposes can be carried out in a pressure-dependent and therefore also use-dependent manner according to logical criteria.

Advantageous improvements of the process disclosed, for example, the requirement of the regulations that pertain to permission to operate the vehicle, can be fulfilled by means setforth herein.

With the process feature disclosed, e.g. the operational readiness of the vehicle can be brought about in an accelerated manner.

Furthermore, it is possible to advantageously protect another consumer circuit against increased pressure load when the selected circuit requires a higher operating pressure or has an increased compressed air consumption, for example for the pneumatic shock absorption of the vehicle.

The switching on of the air compressor for a short time can be prevented in a simple manner with the process feature.

For example in the event of an unsealed or leaky consumer circuit, during the further operation of the compressed air system, a loss of compressed air as well as an increased strain on the compressed air supply device is prevented by means of the measure indicated herein.

In a suitable manner, this kind of state of the compressed air system is communicated to the driver of the vehicle so that measures can be taken to rectify the malfunction.

The process is a significant advantage for the economical operation of the vehicle because in comparison to the usual operating mode of the compressed air supply device, other criteria can be used, for example, whether the drive motor of the vehicle is operated at a high output level and therefore a switching on of the air compressor is not advised.

The measures set forth are used in a suitable manner to exploit kinetic energy intrinsic to the vehicle for the operation of the air compressor.

The process features described herein can be used for the operation of the air compressor, by virtue of the fact that when not needed, either the compressed air supplied is diverted to a relief point or the air compressor is uncoupled as needed from the drive or the air supply of the driven air compressor is switched off by the control electronics.

From the standpoint of compressed air consumption balance, the process is advantageous because by means of it, the different demand for compressed air occurring in the consumer circuits can be compensated for by the control electronics.

With the process feature set forth, particularly dry compressed air is advantageously used for regenerating the air drier so that the required regeneration air volume can be kept relatively low.

In lieu of the above-described measures, the regeneration of the air drier can be carried out in a known manner by the withdrawal of regeneration air from a separate container.

Through corresponding programming of the control electronics, different operating modes are possible for the regeneration control.

Finally, through the use of the process steps indicated, it is advantageously possible to supply the air drier with complete drying capacity for the subsequent initial operation of the vehicle and to prevent the freezing of the valve by means of blowing out accumulated water in the region of the safety valve with the regeneration air diverted to the relief point. It is therefore possible to dispense with an electrical heating of the safety valve.

BRIEF DESCRIPTION OF THE DRAWINGS

Exemplary embodiments of the invention are shown in simplified form in the drawings and are explained in detail in the following description.

DESCRIPTION OF THE EXEMPLARY EMBODIMENTS

Figure 1:
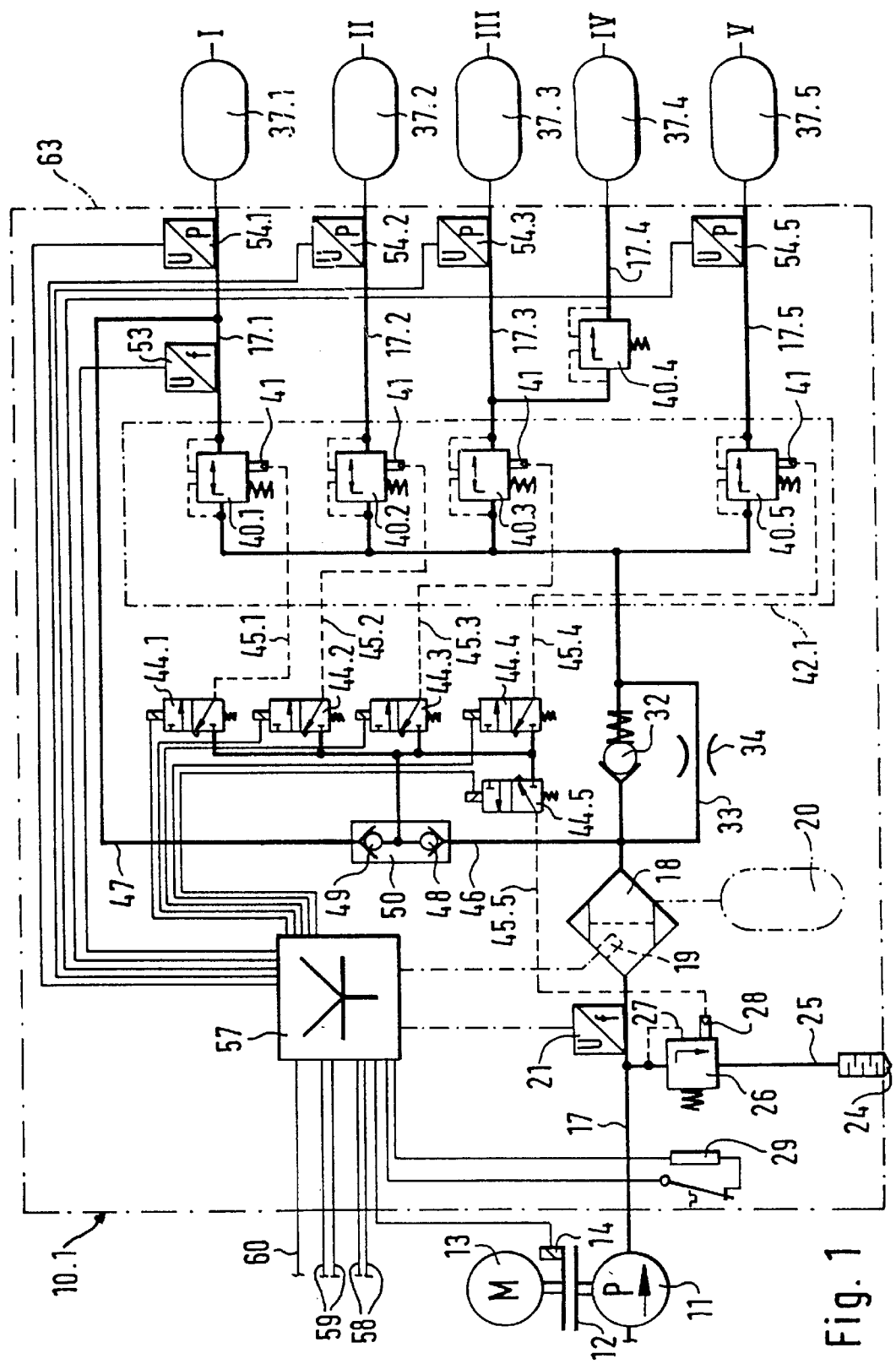
FIG. 1 is a switching diagram of a compressed air supply device with a controllable overflow valve in the consumer circuits.

The compressed air supply device 10.1, which is for vehicle compressed air systems and is schematically represented in FIG. 1 of the drawings, is preferably designated for use in commercial vehicles. The device 10.1 has an air compressor 11, which is coupled to the drive motor 13 of the vehicle by means of a loose coupling 12. The coupling 12 can be switched in an electrically controlled manner; a corresponding actuation means 14 is therefore depicted.

An air supply line 17 leads from the air compressor 11 to an air drier 18 that can be regenerated. A humidity sensor 19 for measuring the moisture contained in the granulate of the air drier can be connected to the air drier 18, which moisture is removed from the compressed air supplied by the air compressor 11. The air drier 18 can also be connected to a container 20 for storing regeneration air, which is supplied to the air drier when removing the moisture from the granulate that can be regenerated using the reverse flow process. In addition, a humidity sensor 21 can be connected to the supply line 17 between the air compressor 11 and the air drier 18 and can monitor the water content of both the compressed air supplied by the air compressor 11 and the regeneration air diverted from the air drier 18.

Between the air compressor 11 and the air drier 18, a branch line 25 leads from the supply line 17 to a pressure relief point 24. A safety valve 26 in the structural form of a pressure limiting valve is disposed in this line and, actuated via a control line 27, limits the maximal system pressure in the vehicle compressed air system. Furthermore, the safety valve 26 can be pneumatically switched into the open position via an additional actuation means 28. An electrical heating device 29 is provided to protect the safety valve 26 from freezing.

The supply line 17 is extended after the air drier 18 in five line branches 17.1 to 17.5. On the outlet side of the air drier 18, a spring-loaded check valve 32 is disposed in the supply line 17, which closes the supply line in the direction of the air drier 18. The check valve 32 is bypassed by a bypass line 33 with a throttle location 34, which permits a throttled return flow of air to the air drier 18 for regeneration purposes.

The supply line branches 17.1 to 17.5 are connected to compressed air consumer circuits I to V of the vehicle compressed air system (of the consumer circuits I to V, only a compressed air reservoir 37.1 to 37.5 is depicted). The consumer circuits I and II are service brake circuits and like the consumer circuit III, which constitutes an auxiliary brake circuit, are part of the brake system of the vehicle. The circuit IV is a secondary consumer circuit and the consumer circuit V is an air shock absorber circuit.

In each of the supply line branches 17.1 to 17.5, an overflow valve 40.1 to 40.5 with limited return flow is disposed upstream of the reservoirs 37.1 to 37.5 of the compressed air consumer circuits I to V, viewed in terms of the feed direction. These overflow valves 40.1 to 40.5 are used for compressed air supply and for pressure safeguarding of the connected compressed air consumer circuits I to V, wherein compressed air supply is understood to mean the delivery of compressed air to the consumer circuits, which has been supplied by the air compressor 11 and dried in the air drier 18. Diverging from the overflow valve 40.4 disposed in feed line branch 17.4, the overflow valves 40.1 to 40.3 and 40.5 are embodied as switchable closing members which can be switched by an additional actuation means 41 into a position that closes the associated line branch. In the exemplary embodiment represented in FIG. 1, this is a pneumatic actuation means 41, which in the embodiment of the overflow valve disclosed by DE 42 09 034 A1, can be a control chamber that can be acted upon by control air, in which a compression spring is disposed, which loads a sleeve piston in the closing direction. In a modification of the exemplary embodiment, the actuation means 41 can also be an electromagnetic or electromechanical one. The overflow valves 40.1 to 40.3 and 40.5 embodied as closing members can be united in the structural form of the four-circuit protection valve 42.1, as indicated with a dot-and-dash outline.

The pneumatic actuation means 41 can be respectively switched by means of a pilot valve 44.1 to 44.4, which is embodied as a 3/2-way valve. In addition, a fifth pilot valve 44.5 of the same structural form is provided in order to be able to switch the safety valve 26 via its actuation means 28. In a spring-actuated fashion, the pilot valves 44.1 to 44.5 assume a position in which a control line branch 45.1 to 45.5 that leads to the respective actuation means 41 or 28 is ventilated to the atmosphere. In its second, electromagnetically actuated position, however, the control line branches 45.1 to 45.5 are switched into the open position. For the supply of control pressure, the control line branches 45.1 to 45.5 are connected via a control line 46 to the supply line 17 on the downstream side of the air drier 18, and are also connected via a control line 47 between the overflow valve 40.1 and the reservoir 37.1 to the supply line branch 17.1 of the compressed air consumer circuit I. The two control lines 46 and 47 are safeguarded in relation to each other by means of check valves 48 and 49, which can be combined into one reversing valve 50. According to the operating mode of the compressed air supply device 10.1, it can also be sufficient to provide only the control line 46 or the control line 47. The check valves 48 and 49 can then be dispensed with.

An additional humidity sensor 53 is associated with the compressed air supply device 10.1 and is connected between the overflow valve 40.1 and the reservoir 37.1 to the supply line branch 17.1 of the compressed air consumer circuit I. In addition, pressure sensors 54.1 to 54.3 and 54.5 are connected to the corresponding supply line branch 17.1 to 17.3 and 17.5 between the corresponding overflow valve 40.1 to 40.3 and 40.5 and the associated reservoir 37.1 to 37.3 and 37.5, which sensors are provided for monitoring the pressure in the compressed air consumer circuits I to III and V.

A further component of the compressed air supply device 10.1 are electronics 57 which carry out control and regulation functions according to their programming and are described below as control electronics. The control electronics 57 are connected to the actuation means 14 of the loose coupling 12, the humidity sensors 19, 21, and 53, the pilot valves 44.1 to 44.5, and the pressure sensors 54.1 to 54.3 and 54.5. Power is supplied to the control electronics 57 via lines 58. The control electronics 57 are connected to the engine control of the vehicle via a data bus 59; in addition, a line 60 leads to a status indicator of the compressed air supply device 10.1 in the driving compartment of the vehicle.

All of the elements of the compressed air supply device 10.1 disposed between the air compressor 11 and the compressed air reservoirs 37.1 to 37.5 can be combined into a device unit 63, as is indicated in FIG. 1 with a dot-and-dash outline.

The compressed air supply device 10.1 has the following functions:

The valves of the compressed air supply device 10.1 assume the positions represented in FIG. 1 and the air compressor 11 that is coupled to its drive motor 13 delivers compressed air into the supply line 17. The humidity is removed from the air when it flows through the air drier 18 and after overcoming the check valve 32, travels into the supply line branches 17.1 to 17.3 and 17.5. At the same time, compressed air flows through the control line 46 to the pressure control valves 44.1 to 44.5. When the opening pressure of the overflow valves 40.1 to 40.3 and 40.5 is exceeded, compressed air flows into the reservoirs 37.1 to 37.3 and 37.5 of the compressed air consumer circuits I to III and V and after the opening of the overflow valve 40.4, furthermore flows through the supply line branch 17.4 to the compressed air reservoir 37.4 of the secondary consumer circuit IV. The opening pressures of the overflow valves 40.1 to 40.3 and 40.5 can be adjusted by means of mechanical adjustment in such a way that the two circuits I and II are filled before the other circuits III to V. With the initial operation of the vehicle, the pressure is continuously monitored in the consumer circuits I to III and V by the control electronics 57 with the pressure sensors 54.1 to 54.3 and 54.5. According to the programming of the control electronics 57, the filling of the compressed air consumer circuits I to V can be varied in a pressure-dependent manner. For example in the event of an equivalent adjustment of the opening pressure of the overflow valves 40.1 to 40.3 and 40.5, a high-priority filling of the consumer circuits I and II can be achieved by virtue of the fact that by switching the pilot valves 44.3 and 44.4 into their magnetically actuated position, control air is switched into the pneumatic actuation means 41 of the overflow valves 40.3 and 40.5 so that these assume their closed position. The two overflow valves 40.3 and 40.5 now function as a closing member, which disconnects the consumer circuits III and IV or V from the supply of compressed air. When the operating pressure is achieved in the consumer circuits I and II, the control electronics 57 cancel the stopping of the other circuits by switching the pilot valves 44.3 and 44.4 into their spring-actuated position. The consumer circuits III to V are now filled with compressed air.

To fill the air shock absorber circuit V to a higher operating pressure in comparison to the other circuits I to IV, the control electronics 57 switch the overflow valves 40.1 to 40.3 into their position that stops the supply of compressed air. The compressed air supplied by the air compressor 11 is therefore now only supplied to the compressed air consumer circuit V. When the operating pressure of circuit V is reached, which is monitored by the pressure sensor 54.5 and is disposed below the switch-off pressure of the safety valve 26, then if the other circuits are full, the supply of the air compressor 11 can be switched off. In order to retain the increased pressure level in the air shock absorber circuit V, the overflow valve 40.5 is switched into the closed position through the injection of control pressure into its actuation member 41. If all of the overflow valves 40.1 to 40.3 and 40.5 assume their closed position, then when the air supply is switched off, control air can be taken from circuit I using the control line 47.

Compressed air is consumed to different degrees by means of the consumers connected to the circuits I to V. When the closed position of the overflow valves 40.1 to 40.3 is cancelled by the control electronics 57, a pressure compensation between the circuits I to IV can take place, provided that the closing pressure of the respective overflow valve is not exceeded. By maintaining the closed position of the corresponding overflow valve, the control electronics 57 can also exclude circuits other than the air shock absorber circuit V from the exchange of compressed air. If the control electronics 57 recognize that the limit pressure achieved when the compressed air consumer circuit is filled up has fallen by a programmed pressure difference due to the consumption of compressed air, then the compressed air supply of this circuit is admitted. For example, when the vehicle is coming down a mountain, if the two service brake circuits I and II are subject to an increased consumption of compressed air due to longer lasting braking procedures, then the remaining circuits III to V are disconnected from the compressed air supply and preferably the two service brake circuits I and II are filled by means of air supply. When their limit pressure is reached, the circuits I and II are disconnected and if need be, other circuits are filled.

It can therefore be seen that the compressed air supply of the compressed air consumer circuits I to V by means of corresponding programming of the control electronics 57 with regard to the initial filling, the filling succession of the circuits, the adjustment of different operating pressures, the compensation for varying compressed air consumption in the circuits, as well as the refilling of the circuits can be varied within wide limits. Criteria for the programming can, for example, be the type of vehicle, the equipping of the vehicle, and its mode of operation.

The operation of the air compressor 11 can be controlled through correspondingly programming the control electronics 57. In this manner, the control electronics 57 can switch on the air compressor 11 when the vehicle is coasting in order to use the kinetic energy of the vehicle to fill the compressed air consumer circuits I to V. This can be used to fill a circuit to a pressure level that is higher in comparison to the operating pressure in order to subsequently fill other circuits that have a lower desired pressure with compressed air from this circuit as needed. However, if the full output of the drive motor 13 is necessary to propel the vehicle, by triggering the electromagnetic actuating means 14, the control electronics 57 switch the air compressor 11 off by separating the loose coupling 12. However, if the pressure drops impermissibly low in the service brake circuits I and II in this driving state, then the air compressor 11 is switched on again by the control electronics 57.

If the vehicle has no loose coupling 12 between the drive motor 13 and the air compressor 11, then the compressor can be switched into neutral by virtue of the fact that by switching the pilot valve 44.5, the control electronics 57 injects control air into the actuating means 28 of the safety valve 26 and switches this valve into its open position. The air supplied by the air compressor 11 is now diverted to the pressure relief point 24 by means of the safety valve 26. However, it is more economical if the air compressor 11 has a device, not shown, with which the suction valve is switched into an inactive state or a bypass connection can be connected between the intake chamber and the compression chamber of the air compressor 11.

For the control of the air compressor 11, the control electronics 57 receives corresponding data from the engine control via the data bus 59. In addition, the control electronics 57 are capable of sending information to a status indicator of the compressed air system disposed in the driving compartment of the vehicle in order to inform the driver what pressure conditions are present in the compressed air consumer circuits I to V and if need be, whether there are malfunctions. If the control electronics 57 detect a defect, e.g. due to a leak, when the pressure in a consumer circuit falls below or does not achieve a predetermined pressure threshold, then the affected consumer circuit is disconnected from the compressed air supply by switching the corresponding overflow valve into the closed position.

To initiate and control the regeneration of the air drier 18, the control electronics 57 evaluates the signals of the humidity sensors 19, 21, 53. However, the control electronics 57 can receive data regarding the temperature of the compressed air supplied, the speed of the air compressor 11, etc. The control electronics 57, in accordance with their programming and the sensor equipment of the compressed air supply device 10.1, are equipped to control the regeneration duration of the air drier 18 as a function of air quantity, pressure, time, or humidity. If as a result of the measurement values of the humidity sensor 53, the control electronics 57 recognize that the compressed air supplied to the consumer circuit I has an impermissibly high moisture content, then when there is ineffective air supply of the air compressor 11, the regeneration of the air drier 18 is initiated by the switching over of the safety valve 26. To this end, compressed air can be taken from the consumer circuits I to V, which travels through the bypass line 33 via the throttle location 34 and flows through the granulate in the air drier 18 in the direction counter to the air supply direction. The regeneration air absorbs moisture stored in the granulate and carries it away to the pressure relief point 24 via the safety valve 26. By means of corresponding switching of the overflow valves 40.1 to 40.3 and 40.5, it can be assured that the regeneration air is withdrawn from the consumer circuit that has the highest pressure level. Or the regeneration air is taken from the consumer circuit that was filled first after the preceding regeneration of the air drier 18 so that it contains particularly dry air. In lieu of this, the regeneration of the air drier 18 can also occur by means of the withdrawal of regeneration air stored in the reservoir 20. The control electronics 57 can control the duration of the regeneration for example as a function of time, or as a function of the pressure drop of the consumer circuit that supplies the regeneration air, or by sensing the moisture content of the regeneration air leaving the air drier 18 by means of the humidity sensor 21. When using the humidity sensor 19 disposed in the drying granulate, the beginning and end of the regeneration are controlled in conjunction with the moisture content of the drying granulate.

In addition to during driving operation, a regeneration of the air drier by the control electronics 57 can also be controlled after the vehicle is switched off, by virtue of the fact that the safety valve 26 is switched into its open position and in the event of the withdrawal of the regeneration air, for example from the air shock absorber circuit V, the overflow valves 40.1 to 40.3 of the remaining consumer circuits I to IV are switched into the closed position. Since water accumulations in the region of the safety valve 26 due to the pressure decrease during regeneration are blown out, the electrical heating 29 that prevents the freezing of the safety valve can possibly be eliminated. After the regeneration is over, by means of switching the pilot valves 44.1 to 44.3 and 44.5 into their spring-actuated position, the control electronics 57 switch the overflow valves 40.1 to 40.3 and the safety valve 26 into their initial position shown in the drawing. When the vehicle is started up again, the air drier 18 is available with full drying capacity.

Figure 2:
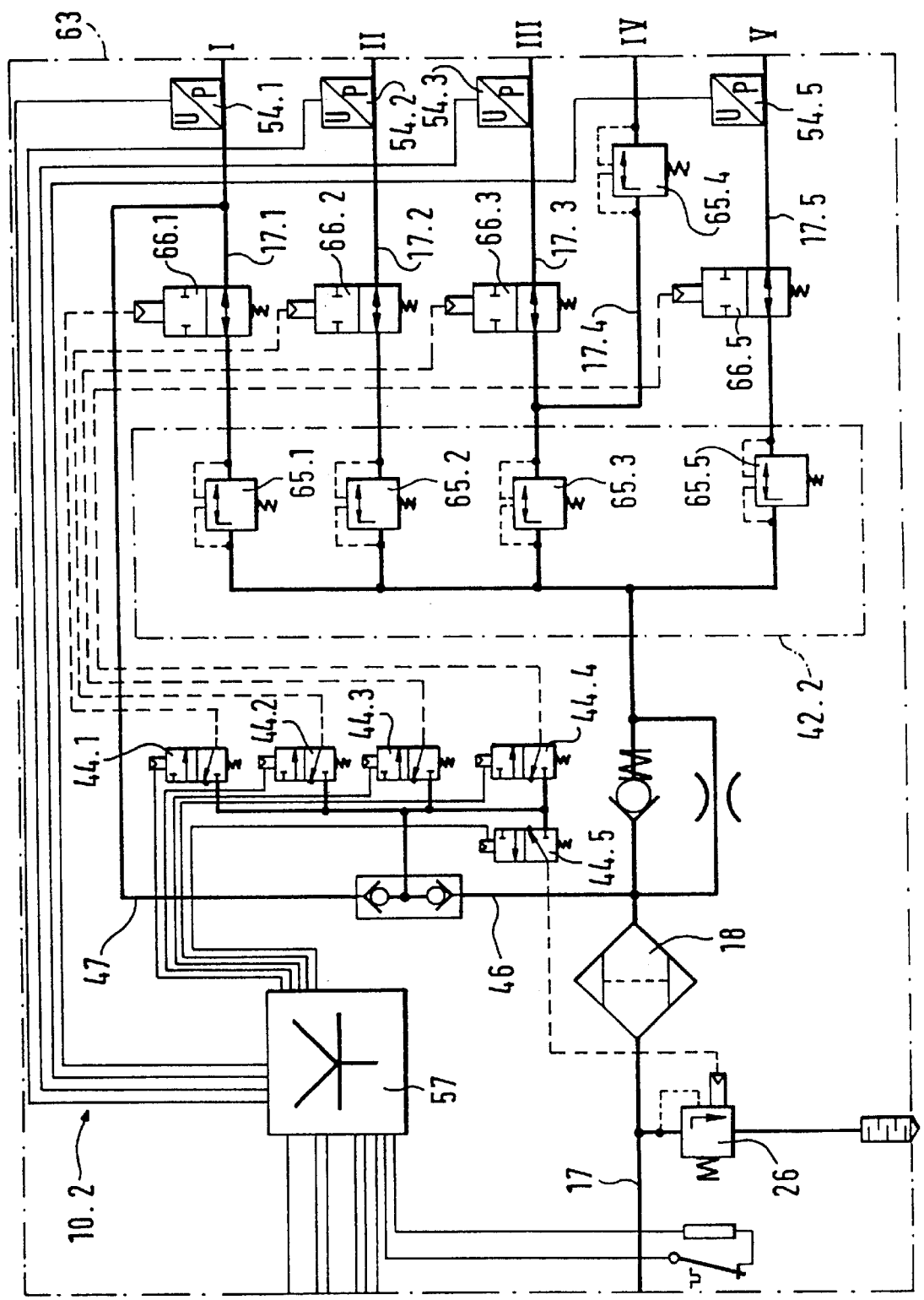
FIG. 2 is a switching diagram according to FIG. 1, with a series connected overflow valve as well as a switchable closing member in the consumer circuits.

The second exemplary embodiment of a compressed air supply device 10.2 represented in FIG. 2 differs from the first exemplary embodiment essentially in that the four-circuit protection valve 42.2 contains overflow valves 65.1 to 65.3 and 65.5 without additional actuation means. In lieu of this, a closing member in the form of a stop valve embodied as a 2/2-way valve 66.1 to 66.3 and 66.5 is disposed in each of the feed line branches 17.1 to 17.3 and 17.5, downstream of the overflow valves in the flow direction. When not triggered, the directional valve assumes its spring-actuated open position. In the same manner as in the first exemplary embodiment, the control electronics 57 can switch this valve into its closed position by means of the pilot valves 44.1 to 44.4 through pneumatic actuation. The closing member can also be disposed in the feed direction upstream of the overflow valves 65.1 to 65.3 and 65.5 in the supply line branches 17.1 to 17.3 and 17.5. The mode of operation of the compressed air supply device 10.2, which is likewise equipped with pressure sensors 54.1 to 54.3 and 54.5 is the same as in the exemplary embodiment according to FIG. 1.

Figure 3:
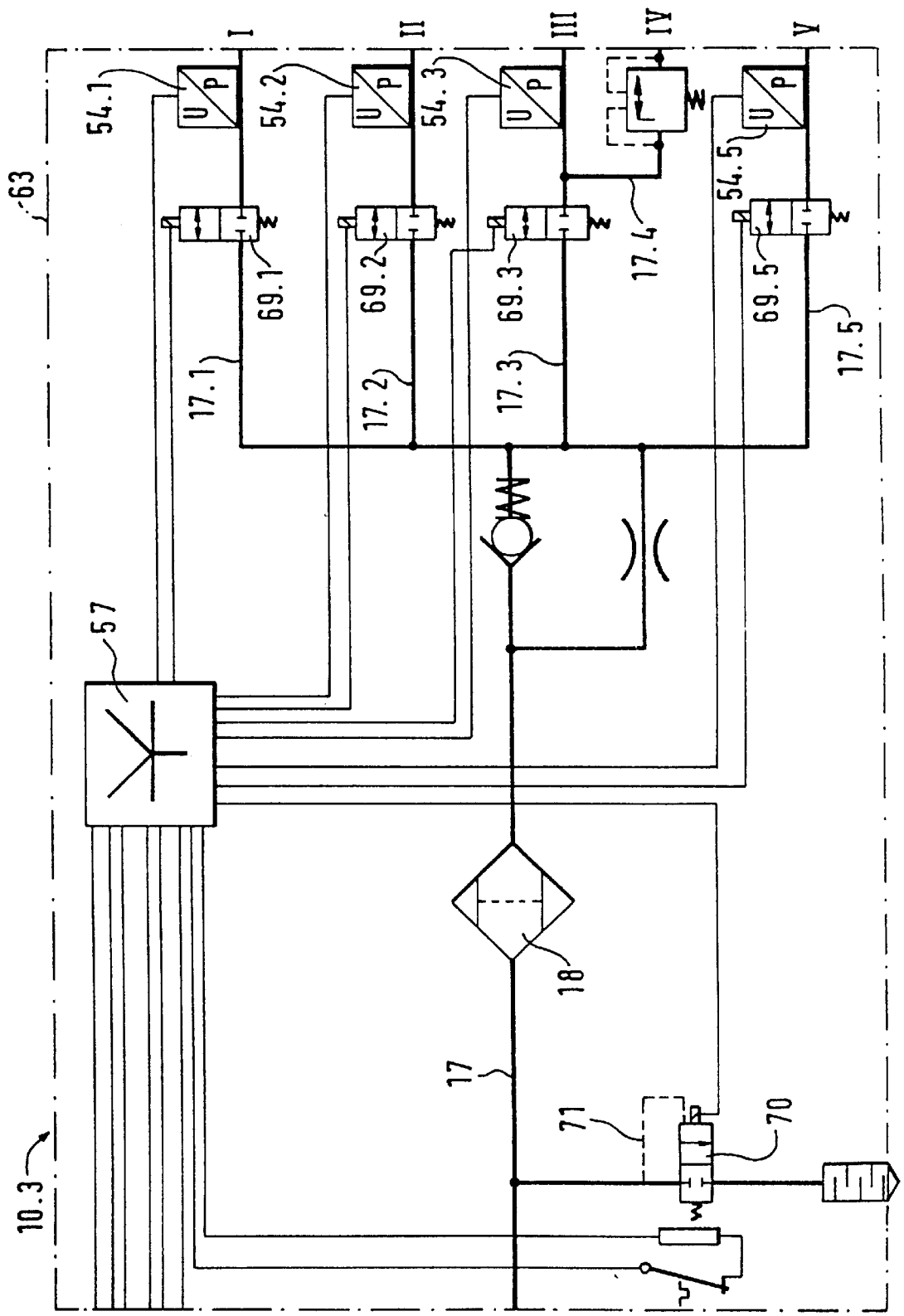
FIG. 3 is a switching diagram of a compressed air supply device with only one switchable closing member in the consumer circuits.

The third exemplary embodiment of the compressed air supply device 10.3 according to FIG. 3, however, is shown in a manner that is considerably simplified in comparison to the two preceding exemplary embodiments with regard to the valves and controls. Here, a 2/2-way valve 69.1 to 69.3 and 69.5 with a spring-actuated closed position is respectively disposed as a switchable closing member in each of the supply line branches 17.1 to 17.3 and 17.5. The directional valves can be switched into their open position directly by the control electronics 57 through electromagnetic actuation. This compressed air supply device 10.3, too, can be controlled in a manner that corresponds to that in the first exemplary embodiment because of the pressure sensing in the consumer circuits I to III and V by means of the pressure sensors 54.1 to 54.3 and 54.5 through the corresponding control of the directional valves 69.1 to 69.3 and 69.5. In addition, the safety valve of the compressed air supply device is embodied in the form of a 2/2-way valve 70, which the control electronics 57 can electromagnetically or electromechanically switch from its spring-actuated closed position into the open position for the purpose of regeneration control. In order to limit the maximum permissible pressure in the vehicle compressed air system for safety reasons, the directional valve 70 can also be pneumatically switched into its open position via a control line 71.

The foregoing relates to preferred exemplary embodiments of the invention; it being understood that other variants and embodiments thereof are possible within the spirit and scope of the invention; the latter being defined by the appended claims.

What is claimed is:

1. A compressed air supply device (10.1) for vehicle compressed air systems which comprises, an air compressor (11) provided with an outlet, from said outlet a supply line (17) leads to an air drier (18), said air drier includes an inlet and an outlet side for supplying compressed air to a compressed air system, a safety valve (26) is connected to the supply line (17) to divert air to a pressure relief point (24) upstream of said air dryer and down stream of the air compressor, on the outlet side of the air drier (18) at least two compressed air consumer circuits, whose pressure is monitored by at least two pressure sensors, are connected to the supply line (17), control electronics (57) are provided, which are connected to the pressure sensors and at least one solenoid valve for controlling a regeneration of the air drier (18), and which control the compressed air supply of the air compressor (11), on the outlet side of the air drier (18), the supply line (17) branches into line branches that lead to at least two consumer circuits, a closing member disconnects the consumer circuits from the compressed air supply, the closing member being disposed in the respective line branch and switched by the programmable control electronics (57), the closing member is an overflow valve that is disposed in the line branch and is switched into the closed position with a pneumatic actuation means (41), and a 3/2-way pilot valve (44.1) is disposed in a control line of the pneumatic actuation means (41).

2. A compressed air supply device according to claim 1, in that the closing member is a stop valve disposed in the line branch.

3. A compressed air supply device according to claim 2, in that the closing member is an actuatable 2/2-way valve with a spring-actuated closed position.

4. A compressed air supply device according to claim 2, in that the closing member is a 2/2-way valve with a spring-actuated open position disposed at an overflow valve in the branch.

5. A compressed air supply device according to claim 1, in that the control lines (46, 47) are connected to both the supply line (17) and to the consumer circuit, wherein a check valve (48, 49) is disposed in each control line (46, 47).

6. A compressed air supply device according to claim 5, in that a line branch (45.5) leads from the control line (46, 47) to a pressure limit safety valve (26), which is equipped with the pneumatic actuation means (28) and is switched into the open position by an electromagnetically actuatable 3/2-way pilot valve disposed in the line branch (45.5).

7. A compressed air supply device according to claim 1, in that the pilot valve (44.1) is electromagnetically switched by the control electronics (57) into a position in which the control line is switched into an open position.

8. A compressed air supply device according to claim 1, in that a 2/2-way safety valve (70) assumes a closed position in a spring-actuated manner and is switched into an open position in an actuated fashion by the control electronics (57), or switched into the open position by the pressure in the supply line (10.3).

9. A compressed air supply device according to claim 1, in that the control electronics (57) are connected to an actuation means (14) for a coupling (12) for disconnecting the air compressor (11) for a drive motor (13).

10. A compressed air supply device according to claim 1, in that the control electronics (57) are connected to an actuation means for controlling the air compressor (11) in an idle position.

11. A compressed air supply device according to claim 1, in that the control electronics (57) are connected to the engine control of the vehicle via a data bus (59).

12. A compressed air supply device according to claim 1, in that the closing member is an overflow valve that is disposed in the line branch and can be switched into the closed position with an electromagnetic actuation means.

13. A process for controlling a compressed air supply device (10.1) for vehicle compressed air systems which comprises controlling a control electronics (57) for controlling the compressed air supply of the compressed air supply system as a function of pressure in at least two compressed air consumer circuits, monitoring the pressure by the control electronics (57) in at least two consumer circuits, operating the control electronics (57) to disconnect the consumer circuits from the compressed air supply as a function of a pre-programmed limit pressure that depends on the circuit, operating the control electronics (57) to connect at least two respective consumer circuits to the compressed air supply when the pressure falls below a limit pressure by a pre-programmed pressure difference, which comprises operating the control electronics (57) to select a consumer circuit for filling said consumer circuit with compressed air while at least one other consumer circuit is disconnected from the filling, and operating the control electronics (57) to connect the consumer circuit to the compressed air supply of the air supply system in a pre-programmed order.

14. A process according to claim 13, which comprises operating the control electronics to a select a consumer circuit which is filled to a higher pressure than the at least one other consumer circuit (I).

15. A process according to claim 14, which comprises filling the at least one other consumer circuit from the consumer circuit that has a higher pressure.

16. A process according to claim 13, which comprises operating the control electronics (57) to disconnect the affected consumer circuit from the compressed air supply when the pressure falls below a predetermined pressure threshold.

17. A process according to claim 16, which comprises controlling a status indicator, which is disposed in a driving compartment of the vehicle and is part of the compressed air system by operating the control electronics (57).

18. A process according to claim 13, which comprises operating the control electronics (57) to switch the safety valve (26) of the compressed air system into the position that disconnects the compressed air and switching the closing members of the consumer circuits into the closed position.

19. A process according to claim 13, which comprises connecting the air compressor (11) to a drive motor (13) by means of a coupling (12) that is switched by operating the control electronics (57).

20. A process according to claim 13, which comprises switching the air compressor (11) into a no-load operation by operating the control electronics (57).

21. A process according to claim 13, which comprises taking the air required for the regeneration of the air drier (18) disposed in the compressed air supply device (10.1) from the consumer circuit which is at the highest pressure level, while the closing member (40.1) associated with the at least one other consumer circuit is held in the closed position.

22. A process according to claim 21, which comprises controlling the regeneration duration by the control electronics (57) as a function of air quantity, pressure, time, or moisture.

23. A process according to claim 21, which comprises controlling the regeneration of the air drier (18) by operating the control electronics (57) after the vehicle is switched off, by presenting the safety valve (26), switching the safety valve into its open position and in the event that regeneration air is taken from a consumer circuit, switching the closing member of the at least one other consumer circuit into the closed position, and at the end of the regeneration, switching the safety valve (26) and the closing member.

24. A process according to claim 13, which comprises taking a regeneration air for an air drier (18) from the consumer circuit that was filled with compressed air first after the preceding regeneration.

25. A process according to claim 13, which comprises taking the regeneration air from a regeneration air reservoir (20) connected to the air drier (18).

26. A process for controlling a compressed air supply device (10.1) for vehicle compressed air systems which comprises controlling a control electronics (57) for controlling the compressed air supply of the compressed air supply system as a function of pressure in at least two compressed air consumer circuits, monitoring the pressure by the control electronics (57) in at least two consumer circuits, operating the control electronics (57) to disconnect the consumer circuits from the compressed air supply as a function of a pre-programmed limit pressure that depends on the circuit, operating the control electronics (57) to connect at least two respective consumer circuits to the compressed air supply when the pressure falls below a limit pressure by a pre-programmed pressure difference, and operating the control electronics (57) to control the filling of the consumer circuits as a function of the pressure in the circuits as well as an output level of a drive motor of the vehicle.

27. A process according to claim 26, which comprises filling the consumer circuits when a drive motor (13) of the vehicle is driven by a weight of the vehicle during a downward run.

* * * * *